United States Patent
Hofman et al.

(10) Patent No.: US 12,425,053 B2
(45) Date of Patent: Sep. 23, 2025

(54) WIDEBAND MODULAR FILTER/DUPLEXER SYSTEM

(71) Applicant: Outdoor Wireless Networks LLC, Claremont, NC (US)

(72) Inventors: Roman Hofman, Prelouc (CZ); Martin Kufa, Chlumec nad Cidlinou (CZ); Frantisek Ondrácek, Pardubice (CZ); Peter Schmid, Marxheim-Neuhausen (DE); Jiri Kasik, Pardubice (CZ); Libor Strachon, Holice (CZ)

(73) Assignee: Outdoor Wireless Networks LLC, Richardson, TX (US)

( * ) Notice: Subject to any disclaimer, the term of this patent is extended or adjusted under 35 U.S.C. 154(b) by 289 days.

(21) Appl. No.: 18/007,444

(22) PCT Filed: Nov. 2, 2021

(86) PCT No.: PCT/US2021/057755
§ 371 (c)(1),
(2) Date: Jan. 30, 2023

(87) PCT Pub. No.: WO2022/098660
PCT Pub. Date: May 12, 2022

(65) Prior Publication Data
US 2023/0283304 A1 Sep. 7, 2023

Related U.S. Application Data

(60) Provisional application No. 63/111,185, filed on Nov. 9, 2020.

(51) Int. Cl.
*H04B 1/00* (2006.01)
*H04L 5/14* (2006.01)

(52) U.S. Cl.
CPC ......... *H04B 1/0057* (2013.01); *H04L 5/1461* (2013.01)

(58) Field of Classification Search
CPC ............................ H04B 1/0057; H04L 5/1461
See application file for complete search history.

(56) References Cited

U.S. PATENT DOCUMENTS

| 8,212,379 B2 * | 7/2012 | Sadan | H04B 3/56 307/1 |
| 8,254,850 B2 | 8/2012 | Wayman et al. | |

(Continued)

FOREIGN PATENT DOCUMENTS

| JP | H0531301 U | 4/1993 |
| KR | 101463239 B1 | 11/2014 |

OTHER PUBLICATIONS

European Patent Office, "Extended European Search Report", dated Sep. 13, 2024, from EP Application No. 21889920.1, from Foreign Counterpart to U.S. Appl. No. 18/007,444, pp. 1 through 8, Published: EP.

(Continued)

*Primary Examiner* — Nizam U Ahmed
(74) *Attorney, Agent, or Firm* — Fogg & Powers LLC

(57) ABSTRACT

A modular filter system includes a wideband combiner, which includes an antenna connector and wideband filter connectors, and multiple filter modules. A first filter module includes a first connector configured to pass a first frequency band. The first filter module includes a combiner connector configured to pass the first frequency band, which is coupled to the combiner connector. The second filter module includes second, third, fourth, and fifth connectors configured to pass second, third, fourth, and fifth frequency bands, respectively. The second filter module further includes a combiner connector configured to pass the second, third, (Continued)

fourth, and fifth frequency bands, which are coupled to the combiner connector.

20 Claims, 7 Drawing Sheets

(56) References Cited

U.S. PATENT DOCUMENTS

| | | | |
|---|---|---|---|
| 8,867,572 | B1 | 10/2014 | Zhan |
| 11,496,161 | B2 * | 11/2022 | Ondracek .............. H01P 1/213 |
| 2008/0037218 | A1 | 2/2008 | Sharma et al. |
| 2008/0285231 | A1 | 11/2008 | Fischer et al. |
| 2010/0116545 | A1 | 5/2010 | Lewison |
| 2013/0077540 | A1 | 3/2013 | Black et al. |
| 2015/0296527 | A1 | 10/2015 | Ranson et al. |
| 2017/0041125 | A1 | 2/2017 | Ko |
| 2018/0069741 | A1 | 3/2018 | Kummetz et al. |
| 2020/0350652 | A1 | 11/2020 | Ondracek et al. |
| 2021/0013920 | A1 | 1/2021 | Na |
| 2021/0058220 | A1 | 2/2021 | Yang et al. |
| 2022/0294423 | A1 * | 9/2022 | Wang ................ H03H 9/02834 |

OTHER PUBLICATIONS

China National Intellectual Property Administration, "First Office Action", from CN Application No. 202090000430.2, Jun. 6, 2022, from Foreign Counterpart to U.S. Appl. No. 16/783,763, pp. 1 through 4, Published: CN.

International Searching Authority, "International Search Report and Written Opinion from PCT Application No. PCT/EP2020/052915", from Foreign Counterpart to U.S. Appl. No. 16/783,763, filed May 19, 2020, pp. 1 through 18, Published: WO.

International Searching Authority, "International Search Report and Written Opinion", from PCT Application No. PCT/US2021/057755, Feb. 15, 2022, pp. 1 through 11, Published: WO.

U.S. Patent and Trademark Office, "Final Office Action", U.S. Appl. No. 16/783,763, filed Jan. 14, 2022, pp. 1 through 29, Published: US.

U.S. Patent and Trademark Office, "Notice of Allowance", U.S. Appl. No. 16/783,763, filed Jun. 29, 2022, pp. 1 through 20, Published: US.

U.S. Patent and Trademark Office, "Office Action", U.S. Appl. No. 16/783,763, filed Jun. 24, 2021, pp. 1 through 43, Published: US.

* cited by examiner

WIDEBAND MODULAR FILTER/DUPLEXER SYSTEM

CROSS-REFERENCE TO RELATED APPLICATIONS

This application is a U.S. National Stage of International Patent Application No. PCT/US2021/057755, filed on Nov. 2, 2021, and titled "WIDEBAND MODULAR FILTER/DUPLEXER SYSTEM," which claims the benefit of U.S. Provisional Application Ser. No. 62/111,185, filed Nov. 9, 2020, and titled "WIDEBAND MODULAR FILTER/DUPLEXER SYSTEM," the contents of all of which are hereby incorporated herein by reference.

BACKGROUND

Distributed antenna systems (DAS) are frequently used to improve wireless coverage provided by one or more base stations. A remote unit of a DAS typically handles multiple technologies and frequency bands by using active and passive components in a single construction. The remote unit includes or is coupled to one or more antennas and is also referred to as a remote antenna unit.

In previous designs for remote units of a DAS supporting multiple frequency bands, the remote unit assembly includes two or more customized duplexers and a combining structure. These components are integrated into a single block to enable bi-directional wireless communications on multiple frequency bands using a single antenna system. The integrated blocks are generally designed and manufactured to meet individual customer requests. Modification of the blocks after manufacture is generally not feasible. If changes are desired for the remote unit after deployment (such as adding a frequency band) an entirely new integrated block is typically designed and manufactured. This increases the cost and time to market for the design. Further, if a component in the integrated block fails, it is often the case that the entire integrated block must be replaced.

SUMMARY

In some examples, a modular filter system includes a wideband combiner that includes an antenna connector and wideband filter connectors. The wideband modular filter system further includes a first filter module that includes a first connector configured to pass a first frequency band, and a first combiner connector configured to pass the first frequency band to a first wideband filter connector, wherein the first frequency band is coupled to the first combiner connector. The wideband modular filter system further includes a second filter module that includes a second connector configured to pass a second frequency band, a third connector configured to pass a third frequency band, a fourth connector configured to pass a fourth frequency band; and a fifth connector configured to pass a fifth frequency band. The second filter module further includes a second combiner connector configured to pass the second frequency band, the third frequency band, the fourth frequency band, and the fifth frequency band to a second wideband filter connector. The second frequency band, the third frequency band, the fourth frequency band, and the fifth frequency band are coupled to the second combiner connector.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
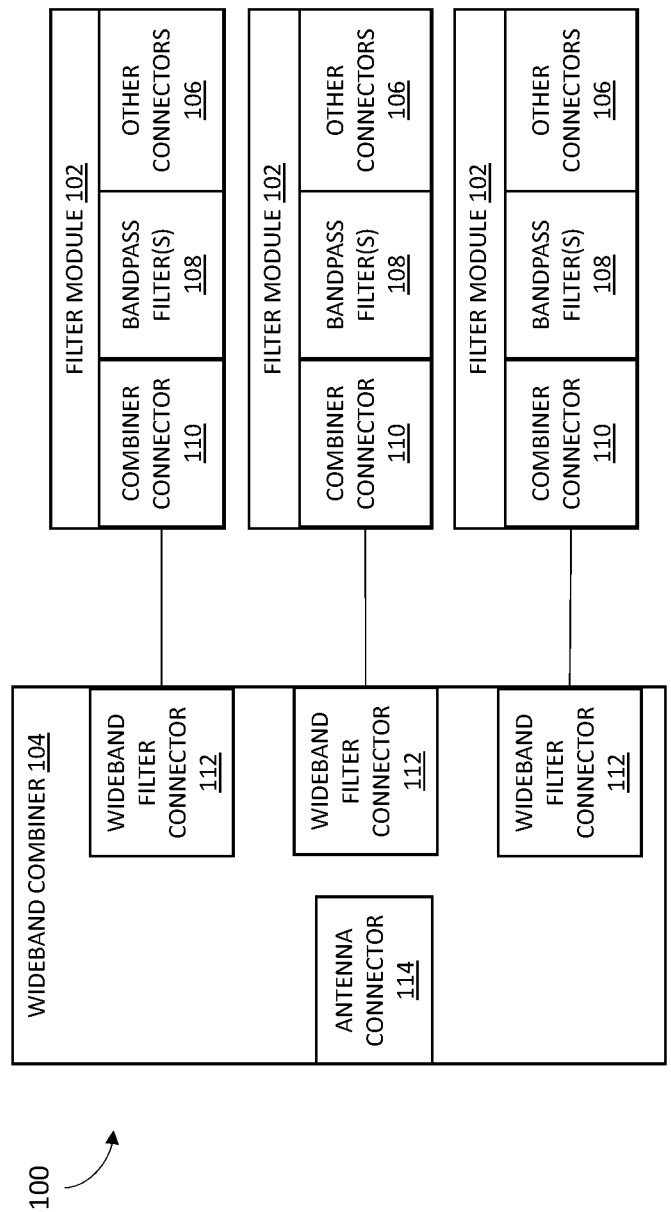
FIG. 1 is a block diagram of example wideband modular filter system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates a block diagram of an example wideband modular filter system 100. In the example shown in FIG. 1, the wideband modular filter system 100 includes a plurality of filter modules 102 and a wideband combiner 104 (also referred to as a wideband, multiband combiner). It should be understood that the particular number components and configuration of the components of the wideband modular filter system 100 can vary depending on requirements.

Each of the filter modules 102 includes a combiner connector 110 and one or more other connectors 106, which are configured to be coupled to other components in a system besides the wideband combiner 104. The combiner connector 110 and the other connectors 106 can be internal or external to the body of the filter module 102. The combiner connector 110 is configured to be coupled to a wideband filter connector 112 of the wideband combiner 104 (for example, using a cable). In some examples, the combiner connector 110 of each filter module 102 is coupled to the wideband filter connector 112 of the wideband combiner 104 with a coaxial cable having a respective characteristic impedance (for example, 50-ohm). In some examples, the other connectors 106 of each filter module 102 are configured to be coupled to a back panel, a power amplifier, or another component of the system that includes the wideband modular filter system 100. In some examples, the other connectors of each filter module 102 are coupled to another component of the system with a coaxial cable having a respective characteristic impedance (for example, 50-ohm). The filter modules 102 each include at least one bandpass filter 108 for each frequency band or combination of close frequency bands that the filter module 102 duplexes, splits, or combines.

In some examples, the filter modules 102 are frequency selective splitter/combiner modules configured to split/combine two or more frequency bands. For signals being received from the wideband combiner 104, the splitter/combiner modules split the signals received at the combiner connector 110 into respective frequency bands or combinations of close frequency bands for output at the respective other connectors 106. For signals being transmitted to the wideband combiner 104, the splitter/combiner modules combine the respective frequency bands or combination of close frequency bands that are received via each of the other connectors 106 for output at the combiner connector 110. In some examples, each respective other connector 106 of a splitter/combiner module is coupled to a respective amplifier in a node of a telecommunications system.

In other examples, the filter modules 102 are diplexer modules configured to multiplex/demultiplex two or more frequency bands. For signals being received from the wideband combiner 104, the diplexer modules demultiplex the signals received at the combiner connector 110 into respective signals in respective frequency bands or combination of close frequency bands for output at the respective other connectors 106. For signals being transmitted to the wideband combiner 104, the diplexer modules multiplex the respective frequency bands or combination of close frequency bands that are received via each of the other connectors 106 for output at the combiner connector 110. In some examples, each respective other connector 106 of a diplexer module is coupled to a respective amplifier in a node of a telecommunications system.

Figures 2A, 2B:
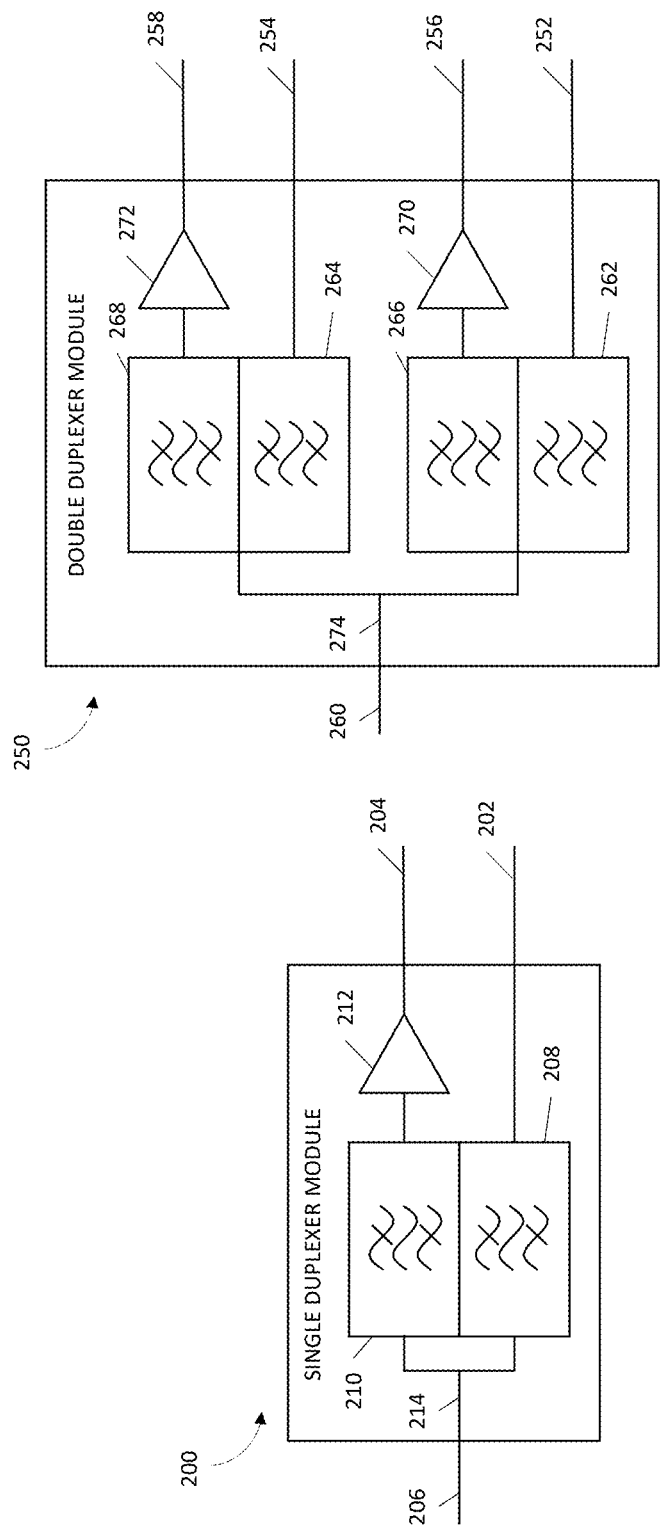
FIG. 2A is a block diagram of an example single duplexer module.
FIG. 2B is a block diagram of an example double duplexer module.

In other examples, the filter modules 102 are duplexer modules configured to duplex uplink and downlink portions of two or more frequency bands or combinations of close frequency bands. In some examples, a duplexer module 102 can be a single duplexer module that includes only a combiner connector 110 and two other connectors 106 and is configured to duplex signals in a single frequency band or a combination of close frequency bands (for example, uplink and downlink portions of the single frequency band or combination of close frequency bands). An example of a single duplexer module 200 is shown in FIG. 2A. In the example shown in FIG. 2A, the single duplexer module 200 includes a downlink connector 202, an uplink connector 204, and a combiner connector 206. The downlink connector 202 is configured to receive and pass downlink signals to the combiner connector 206 via a bandpass filter 208, and the uplink connector 204 is configured to receive and pass uplink signals from the combiner connector 206 to other components of the system via a bandpass filter 210. In the example shown in FIG. 2A, the single duplexer module 200 includes a low noise amplifier 212 coupled between the bandpass filter 210 and the uplink connector 204. In the example shown in FIG. 2A, the single duplexer module 200 duplexes the uplink signals and the downlink signals for the single frequency band or combination of close frequency bands and the bandpass filters 208, 210 are coupled to the combiner connector 206 via the phasing line 214, which is internal to the single duplexer module 200. In some examples, each bandpass filter 208, 210 is coupled to a single phasing line 214 that has complex shape to properly match the impedances for the various bandpass filters 208, 210. In some examples, each bandpass filter 208, 210 is coupled to the phasing line 214 via a respective separate parallel phasing line coupled to a separate trunk phasing line. In some such examples, the phasing lines are mechanically and electrically joined to form a joint by welding, brazing, soldering, applying an adhesive, and/or using mechanical fasteners. In some examples, the phasing line(s) extend through a groove in a conductive body and is(are) precisely positioned in the groove in order to match impedances and reduce insertion loss of signals transmitted through the phasing line(s). In other examples, each bandpass filter 208, 210 is coupled to a common resonator, which makes phase matching similar to a standard phasing line. In other examples, each bandpass filter 208, 210 is coupled to a common resonator and one or more phasing lines.

In some examples, a duplexer module can be a double duplexer module that includes a combiner connector 110 and four other connectors 106 and is configured to duplex signals in multiple distinct frequency bands (for example, two uplink frequency bands and two downlink frequency bands). An example of a double duplexer module 250 is shown in FIG. 2B. In the example shown in FIG. 2B, the double duplexer module 250 includes two downlink connectors 252, 254, two uplink connectors 256, 258, and a combiner connector 260. The two downlink connectors 252, 254 are configured to receive and pass respective downlink signals to the combiner connector 260 via a respective bandpass filter 262, 264, and the two uplink connectors 256, 258 are configured to receive and pass respective uplinks signals via respective bandpass filters 266, 268. In some examples, the uplink connectors 256, 258 and the downlink connectors 252, 254 are configured to couple the double duplexer module 250 to other components in a node of a telecommunications system (such as a remote antenna unit of a distributed antenna system or cloud/centralized radio access network (C-RAN)). For example, the downlink connectors are configured to be coupled to a power amplifier of a node of a telecommunications system. In the example shown in FIG. 2B, the double duplexer module 250 includes a respective low noise amplifier 270, 272 coupled between each respective bandpass filter 266, 268 and uplink connector 256, 258 for the different uplink frequency bands. The double duplexer module 250 duplexes the uplink signals and the downlink signals for the multiple distinct frequency bands and the bandpass filters 262, 264, 266, 268 are coupled to the combiner connector 260 via the phasing line 274, which is internal to the double duplexer module 250. In some examples, each bandpass filter 262, 264, 266, 268 is coupled to a single phasing line 274 that has complex shape to properly match the impedances for the various bandpass filters 262, 264, 266, 268. In some examples, each bandpass filter 262, 264, 266, 268 is coupled to the phasing line 274 via a respective separate parallel phasing line coupled to a separate trunk phasing line. In some such examples, the phasing lines are mechanically and electrically joined to form a joint by welding, brazing, soldering, applying an adhesive, and/or using mechanical fasteners. In some examples, the phasing line(s) extend through a groove in a conductive body and is(are) precisely positioned in the groove in order to match impedances and reduce insertion loss of signals transmitted through the phasing line(s). In other examples, each bandpass filter 262, 264, 266, 268 is coupled to a common resonator, which makes phase matching similar to a standard phasing line. In other examples, each bandpass filter 262, 264, 266, 268 is coupled to a common resonator and one or more phasing lines.

In other examples, a duplexer module could also be configured as a triple duplexer that includes a single combiner connector 110 and six other connectors 106 (3 uplink connectors and 3 downlink connectors) configured to duplex the uplink signals and the downlink signals for the three distinct frequency bands and where the bandpass filters are coupled to the single combiner connector 110 via a phasing line. In other examples, a duplexer module could also be configured as a quadruple duplexer that includes a single combiner connector 110 and eight other connectors 106 (4 uplink connectors and 4 downlink connectors) configured to duplex the uplink signals and the downlink signals for the four distinct frequency bands and where the bandpass filters are coupled to the single combiner connector 110 via a phasing line.

It should be understood that numerous different combinations of filter modules 102 can be used, and each filter module 102 coupled to a wideband filter connector 112 could be a different type of filter module 102. For example, a single filter module, a single duplexer module, and a double duplexer module could be coupled to respective wideband filter connectors 112. Similarly, it should be understood that different types of filter modules 102 than those described above can be used for the wideband modular filter system 100. For example, a filter module 102 could be a time-division duplex (TDD) single filter that is coupled to one wideband filter connector 112 or a triplexer with a single uplink connector, a single downlink connector, and a single combiner connector. A large variety of filter modules 102 can be included to accommodate the particular needs for the application.

The dimensions of the individual filter modules 102 are dependent on the particular frequency band, combinations of close frequency bands, or multiple distinct frequency bands that the filter module 102 is configured to pass. In some examples, the frequency band(s) of the filter modules 102 correspond to standard frequency bands for mobile communications. In some examples, a filter module 102 configured to duplex, combine, or split signals in a lower frequency band range for mobile radio frequency communications (such as, for example, below 1 GHz) is longer than a filter module 102 configured to duplex, combine, or split signals in a middle frequency band range for mobile radio frequency communications (such as, for example, between 1.4 GHz and 2 GHz), which is longer than a filter module 102 configured to duplex, combine, or split signals in a high frequency band range for mobile radio frequency communications (such as, for example, above 2 GHz). The ranges for low, middle, and high frequency bands are by way of example and it should be understood that a filter module can be configured to pass any desired frequency band, combination of close frequency bands, or multiple distinct frequency bands (for example, using a double duplexer module).

In some examples, the wideband combiner 104 includes a respective wideband filter connector 112 for each filter module 102. In one direction (for example, the downlink direction), the wideband combiner 104 is configured to combine signals from the filter modules 102 connected to the wideband filter connectors 112 and provide the combined signals to the antenna connector 114. The antenna connector 114 is configured to be coupled to a multiband antenna (or antenna system) for radiation of the downlink signals. In some examples, the wideband combiner 104 is configured to combine the frequency bands provided by the filter modules 102 connected to the wideband filter connectors 112. In the other direction (for example, the uplink direction), the wideband combiner 104 is configured to split the received signal from the antenna connector 114 and provide the uplink signals in the respective frequency bands to the respective wideband filter connector 112 for the filter module 102 configured to duplex or split signals in the respective frequency band, combination of close frequency bands, or multiple distinct frequency bands.

The wideband combiner 104 is designed such that no modifications of the wideband combiner 104 are necessary after manufacture in order to accommodate replacing or swapping filter modules 102 or to add coverage for any frequency bands according to the combiner design (for example, from 600 MHz up to 2700 MHz or any other frequency range). To implement this, the wideband combiner 104 is configured to have very wide passbands relative to a single duplexer band for the wideband filter connectors 112 to enable flexibility for replacement or swapping out filter modules 102 configured to duplex, combine, or split a different frequency band or combination of frequency bands. In the example shown in FIG. 1, the wideband combiner 104 includes three wideband filter connectors 112 and there can be up to three filter modules 102 included in the wideband modular filter system 100. In some examples, each wideband filter connector 112 is configured to filter and pass signals in different frequency ranges. For example, a first wideband filter connector 112 is configured to filter and pass low frequency bands (for example, less than 1 GHz), a second wideband filter connector 112 is configured to filter and pass middle frequency bands (for example, between 1 GHz and 2 GHz), and the third wideband filter connector 112 is configured to filter and pass high frequency bands (for example, greater than 2 GHz). It should be understood that the particular ranges for low, middle, and high frequency bands could vary depending on the circumstances.

In some examples, the filter modules 102 are positioned between the wideband combiner 104 and a back panel or other component of a node of a telecommunications system. In some examples, the filter modules 102 can be oriented parallel to the face of the wideband combiner 104 that is opposite the antenna connector 114. That is, the filter modules 102 are particularly oriented such that the length of the filter modules 102 runs parallel to the face of the wideband combiner 104 that is opposite the antenna connector 114. In such examples, the filter modules 102 can be stacked or otherwise arranged in a manner that extends away from the wideband combiner 104 in a single dimension.

In other examples, the filter modules 102 are oriented perpendicularly to the wideband combiner 104 rather than parallel to the wideband combiner 104. That is, the filter modules 102 are particularly oriented such that the length of the filter modules 102 runs perpendicular to the face of the wideband combiner 104 and parallel to the longitudinal axis of the wideband modular filter system 100. In such examples, the combiner connectors 110 of the filter modules 102 are particularly designed to reduce cable lengths based on the specific orientation of the filter modules 102.

In other examples, at least one of the filter modules 102 is oriented parallel to the face of the wideband combiner 104 that is opposite the antenna connector 114 while at least one other filter module 102 is oriented perpendicularly to the wideband combiner 104.

In some examples, the filter modules 102 are arranged in a manner corresponding to the order of the wideband filter connectors 112 of the wideband combiner 104. For example, if the wideband filter connector 112 for middle frequency bands is positioned between wideband filter connectors 112 for the low frequency bands and the high frequency bands, then the filter module 102 configured to pass signals in the middle frequency band(s) will be positioned between the filter modules 102 configured to pass the low frequency band(s) and the high frequency band(s).

In some examples, the particular position of at least one of the filter modules 102 in the wideband modular filter system 100 is determined based on the concept of reducing or minimizing insertion loss. For example, a filter module 102 with highest insertion loss can be positioned in this manner. In some examples, the insertion loss is reduced by reducing the total cable length for the filter module 102. In such examples, the total cable length from the filter module 102 to the wideband combiner 104 is considered as well as the cable length from the filter module 102 to another component (for example, the back panel or a power amplifier) in the communication path. In some examples, the other connectors 106 of the filter modules 102 are positioned at one end of the filter module 102, and the combiner connector 110 is positioned at the other end of the filter module 102 nearest the wideband combiner 104. This configuration is particularly advantageous for reducing insertion loss of the filter modules since it minimizes cable length.

In some examples, the wideband combiner 104 and the filter modules 102 can be rigidly secured in place to avoid movement of the components, which could result in detachment of the cables or other faults. Therefore, in some examples, the filter modules 102 and the wideband combiner 104 are secured in place using rigid components (for example, bars and plates). In some examples, the filter modules 102 are coupled to the rigid components using one or more fasteners (for example, screws, rivets, etc.) or pressure produced by fastening the rigid components to other components, such as the wideband combiner 104, for example. In some examples, the filter modules 102 and/or the wideband combiner 104 can also include one or more notches, grooves, and/or recesses to allow one or more rigid components to pass through and more securely fix the components of the wideband modular filter system.

Different regions of the world utilize different frequency bands or combinations of frequency bands in the different frequency ranges discussed above. By including sufficiently wide passbands for the wideband filter connectors 112 in the wideband combiner 104 and configuring each wideband filter connector 112 to filter and pass a different range of frequency bands, any combination of frequencies required worldwide can be accommodated by connecting the appropriate filter modules 102 to the wideband combiner 104. The filter modules 102 can be manufactured individually or in higher volumes for relatively low cost, which provides the needed flexibility to reconfigure operation of the wideband modular filter system 100 for worldwide deployment.

Figure 3:
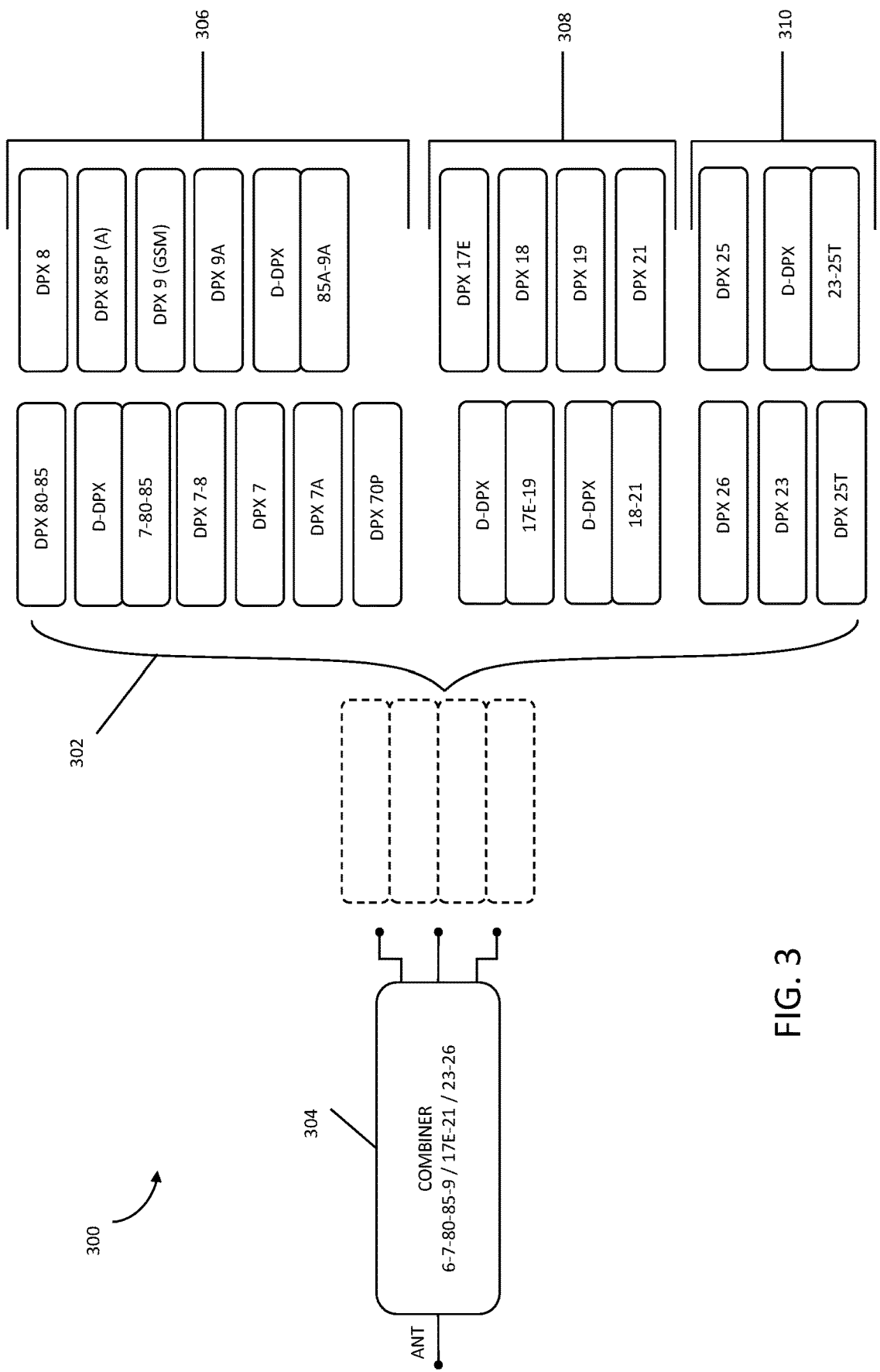
FIG. 3 is a block diagram of an example wideband modular duplexer system.

FIG. 3 illustrates a block diagram of an example wideband modular duplexer system 300 that includes a wideband combiner 304 and duplexer modules 302 and can generally support worldwide deployment today. Depending on the frequencies used for a particular region, different duplexer modules 302 in each frequency range can be utilized to cover the needed frequency bands. If the needed frequencies in a particular frequency range change after installation, the duplexer module 302 in that frequency range can be swapped out for a different duplexer module 302 that supports the desired frequency bands. For example, any of the lower frequency band duplexer modules 306 in FIG. 3 could be swapped for any other lower frequency band duplexer module 306 in FIG. 3. Similar swaps of duplexer modules 302 could also be made within the middle frequency bands (using duplexer modules 308 in FIG. 3) or within the high frequency bands (using duplexer modules 310 in FIG. 3).

The addition or modification of a frequency band will not require replacement of the wideband combiner 104, which was a major concern with previous systems. The wideband combiner 104 includes sufficiently wide passbands for the wideband filter connectors 112 such that adding/modifying frequency bands only requires that a different filter module 102 be used for the wideband modular filter system 100. In the example shown in FIG. 1, if the wideband modular filter system 100 includes three wideband filter connectors and the desired change to the wideband modular filter system 100 was to add another frequency band for duplexing, this would require an exchange of a single duplexer module 200 with a double duplexer module 250 in the same frequency range rather than a complete redesign of the wideband combiner 104.

In some examples, the wideband modular filter systems described above can be included in a remote unit of a distributed antenna system (DAS) that is communicatively coupled to a master unit of the DAS and can be used for indoor or outdoor distribution of radio frequency signals. In some examples, the wideband modular filter system is included in a medium-power or high-power remote unit. In other examples, the wideband modular filter system can be included in a radio frequency repeater, a radio point of a small cell, an access point, or another type of node of a telecommunications system configured to distribute radio frequency signals within a coverage area (for example, the telecommunications systems shown in FIGS. 5-7). While the wideband modular filter system is described with respect to telecommunications systems, it should be understood that the principles described herein are applicable for other technologies that include unidirectional or bi-directional communication using multiple frequency bands and a single antenna.

Figure 4:
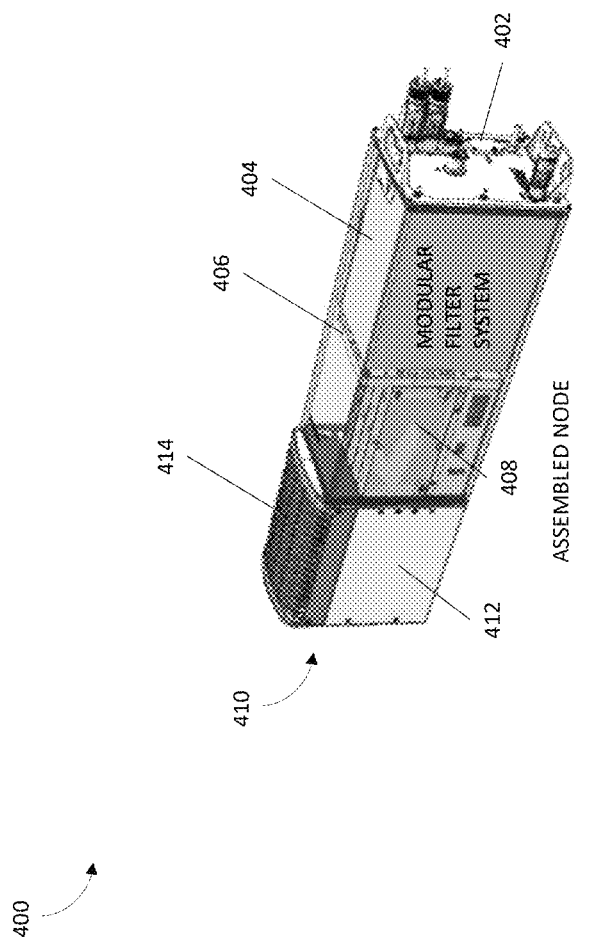
FIG. 4 is a perspective view of an example node of a telecommunications system that includes a modular filter system.

FIG. 4 illustrates an example partially assembled node 400 of a telecommunications system that can include a modular filter/duplexer system described with respect to FIGS. 1-3 above. In the example shown in FIG. 4, the node includes a frame 402, a wideband modular filter system 404, a back panel 406, one or more power amplifier modules 408, and a cooling section 410 for the node 400. It should be understood that the particular components and configuration of the components of the node 400 can vary depending on requirements.

The frame 402 is made of metal or other suitable rigid material. The frame 402 is attached to the wideband modular filter system 404 (for example, to a front panel or to the combiner) using fasteners (for example screws, rivets, or the like). The frame 402 is fixed along the perimeter of the end of the node 400. In some examples, one or more seals are placed between the frame 402 and the wideband modular filter system 404 so the components of the node 400 are protected from dust and other contaminants in the environment surrounding the node 400.

In some examples, a housing can be placed over the wideband modular filter system 404, the back panel 406, and the one or more power amplifier modules 408 of the node 400. In such examples, the housing can be an extruded rectangular tube. In some examples, the housing is cut from a larger extrusion during manufacture, and the length of the housing is flexible and easily adjusted. In some examples, the width and height of the housing are not easily adjusted during manufacture.

The design of the wideband modular filter system 100 shown in FIG. 1 is particularly advantageous when using an extrusion for manufacturing the tube housing, such as that shown in FIG. 4, because the wideband modular filter system 100 can grow in a single dimension (along the longitudinal axis of the node). When there is a high variability in demand for different combinations of frequency bands or when modifications to the remote unit need to be made after installation, a new extruded tube with the proper length can be easily manufactured.

The one or more power amplifier modules 408 are configured to amplify RF signals for transmission, and the one or more power amplifier modules 408 can be contained in the portion of the housing shared by the wideband modular filter system 404. In some examples, each power amplifier module 408 is coupled to a respective downlink connector of a respective filter module of the wideband modular filter system 404. In some examples, the power amplifier modules 408 comprise a plurality of high-power amplifiers mounted to bases that are stacked perpendicularly to the longitudinal axis of the node. In some examples, each power amplifier module 408 includes a respective base. In some examples, respective power amplifier modules 408 are mounted to opposing sides of a common base.

In some examples, the node 400 includes additional components for processing signals in the uplink and downlink paths. In some examples, the node 400 includes a signal processing board, one or more preamplifiers, gain blocks, or other features for conditioning the signals prior to amplification by the high-power amplifiers.

In the example shown in FIG. 4, a cooling section 410 of the node 400 is enclosed with a separate housing 412 that provides protection for the components of the cooling section 410. In some examples, the housing 412 includes vents 414 in one side to facilitate the transfer of heat from the cooling section to the outside environment. In some examples, the cooling section 410 includes one or more fans, and the housing 412 includes one or more holes to accommodate the fans. In some examples, the holes for accommodating the fans are positioned on the side opposite of a vent. In such examples, the fans can be configured to draw in ambient air and blow the air across one or more heat sinks in the cooling section such that warm air is forced out the vent on the other side.

While a separate housing 412 is shown in FIG. 4, it should be understood that the same housing used to cover the wideband modular filter system 404, the back panel 406, and the one or more power amplifier modules 408 can also be elongated to cover the cooling section as well in some examples. In such examples, the housing can include a vent and/or holes to accommodate fans to facilitate heat transfer from the cooling section to the environment. Further, it should be understood that a housing 412 for the cooling section 410 is optional in some environments (for example, indoors) and the cooling section may include uncovered heat sinks and/or fans.

While FIG. 4 is described with respect to a remote unit, the beneficial features described above can be used for other nodes that distribute radio frequency signals to a coverage area. For example, similar designs can be implemented in a radio frequency repeater, radio point for a small cell, an access point, or other nodes of a telecommunications system. While the above examples include components of a telecommunications system, it should be understood that the wideband modular filter systems 100, 300 described herein can be implemented in other types of systems (for example, measurement systems) as well.

Figure 5:
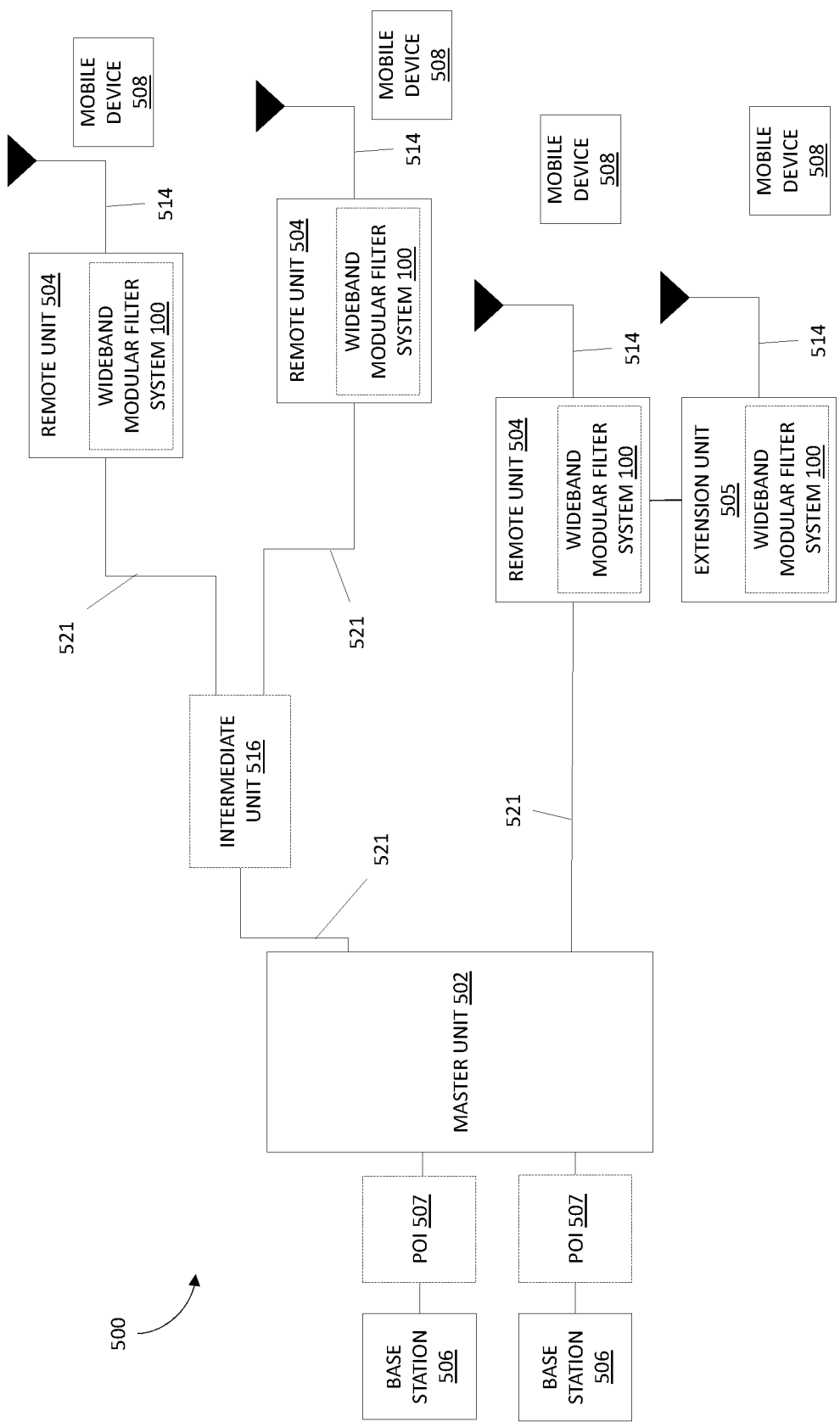
FIG. 5 is a block diagram illustrating an example distributed antenna system utilizing a wideband modular filter system.

FIG. 5 is a block diagram of an example distributed antenna system (DAS) 500 that includes the wideband modular filter system 100 in one or more components of the DAS 500. In the example of FIG. 5, the DAS 500 includes one or more master units 502 (also referred to as "host units" or "central area nodes" or "central units") and one or more remote antenna units 504 (also referred to as "remote units" or "radiating points") that are communicatively coupled to the one or more master units 502. In this example, the DAS 500 comprises a digital DAS, in which DAS traffic is distributed between the master units 502 and the remote antenna units 504 in digital form. The DAS 500 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 502 is communicatively coupled to the plurality of base stations 506. One or more of the base stations 506 can be co-located with the respective master unit 502 to which it is coupled (for example, where the base station 506 is dedicated to providing base station capacity to the DAS 500). Also, one or more of the base stations 506 can be located remotely from the respective master unit 502 to which it is coupled (for example, where the base station 506 is a macro base station providing base station capacity to a macro cell in addition to providing capacity to the DAS 500). In this latter case, a master unit 502 can be coupled to a donor antenna using an over-the-air repeater in order to wirelessly communicate with the remotely located base station.

The base stations 506 can be implemented in a traditional manner in which a base band unit (BBU) is deployed at the same location with a remote radio head (RRH) to which it is coupled, where the BBU and RRH are coupled to each other using optical fibers over which front haul data is communicated as streams of digital IQ samples (for example, in a format that complies with one of the Common Public Radio Interface (CPRI), Open Base Station Architecture Initiative (OBSAI), and Open RAN (O-RAN) families of specifications). Also, the base stations 506 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the base station 506 can be implemented as a small cell base station in which the BBU and RRH functions are deployed together in a single package.

The master unit 502 can be configured to use wideband interfaces or narrowband interfaces to the base stations 506. Also, the master unit 502 can be configured to interface with the base stations 506 using analog radio frequency (RF) interfaces or digital interfaces (for example, using a CPRI, OBSAI, or O-RAN digital IQ interface). In some examples, the master unit 502 interfaces with the base stations 506 via one or more wireless interface nodes (not shown). A wireless interface node can be located, for example, at a base station hotel, and group a particular part of a RF installation to transfer to the master unit 502.

Traditionally, a master unit 502 interfaces with one or more base stations 506 using the analog radio frequency signals that each base station 506 communicates to and from a mobile device 508 (also referred to as "mobile units" or "user equipment") of a user using a suitable air interface standard. Although the devices 508 are referred to here as "mobile" devices 508, it is to be understood that the devices 508 need not be mobile in ordinary use (for example, where the device 508 is integrated into, or is coupled to, a sensor unit that is deployed in a fixed location and that periodically wirelessly communicates with a gateway or other device). The DAS 500 operates as a distributed repeater for such radio frequency signals. RF signals transmitted from each base station 506 (also referred to herein as "downlink RF signals") are received at the master unit. In such examples, the master unit 502 uses the downlink RF signals to generate a downlink transport signal that is distributed to one or more of the remote antenna units 504. Each such remote antenna unit 504 receives the downlink transport signal and reconstructs a version of the downlink RF signals based on the downlink transport signal and causes the reconstructed downlink RF signals to be radiated from an antenna 514 coupled to or included in that remote antenna unit 504.

In some aspects, the master unit 502 is directly coupled to the remote antenna units 504. In such aspects, the master unit 502 is coupled to the remote antenna units 504 using cables 521. For example, the cables 521 can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from mobile devices 508 (also referred to herein as "uplink RF signals") are received at one or more remote antenna units 504 via an antenna 514. Each remote antenna unit 504 uses the uplink RF signals to generate an uplink transport signal that is transmitted from the remote antenna unit 504 to a master unit 502. The master unit 502 receives uplink transport signals transmitted from one or more remote antenna units 504 coupled to it. The master unit 502 can combine data or signals communicated via the uplink transport signals from multiple remote antenna units 504 (for example, where the DAS 500 is implemented as a digital DAS 500, by digitally summing corresponding digital samples received from the various remote antenna units 504) and generates uplink RF signals from the combined data or signals. In such examples, the master unit 502 communicates the generated uplink RF signals to one or more base stations 506. In this way, the coverage of the base stations 506 can be expanded using the DAS 500.

As noted above, in the example shown in FIG. 5, the DAS 500 is implemented as a digital DAS. In some examples of a "digital" DAS, real digital signals are communicated between the master unit 502 and the remote antenna units 504. In some examples of a "digital" DAS, signals received from and provided to the base stations 506 and mobile devices 508 are used to produce digital in-phase (I) and quadrature (Q) samples, which are communicated between the master unit 502 and remote antenna units 504. It is important to note that this digital IQ representation of the original signals received from the base stations 506 and from the mobile units still maintains the original modulation (that is, the change in the instantaneous amplitude, phase, or frequency of a carrier) used to convey telephony or data information pursuant to the cellular air interface standard used for wirelessly communicating between the base stations 506 and the mobile units. Examples of such cellular air interface standards include, for example, the Global System for Mobile Communication (GSM), Universal Mobile Telecommunications System (UMTS), High-Speed Downlink Packet Access (HSDPA), Long-Term Evolution (LTE), Citizens Broadband Radio Service (CBRS), and fifth generation New Radio (5G NR) air interface standards. Also, each stream of digital IQ samples represents or includes a portion of the frequency spectrum. For example, the digital IQ samples can represent a single radio access network carrier (for example, a 5G NR carrier with 40 MHz or 400 MHz signal bandwidth) onto which voice or data information has been modulated using a 5G NR air interface. However, it is to be understood that each such stream can also represent multiple carriers (for example, in a band of the frequency spectrum or a sub-band of a given band of the frequency spectrum).

In the example shown in FIG. 5, the master unit 502 can be configured to interface with one or more base stations 506 using an analog RF interface (for example, via the analog RF interface of an RRH or a small cell base station). In some examples, the base stations 506 can be coupled to the master unit 502 using a network of attenuators, combiners, splitters, amplifiers, filters, cross-connects, etc., which is referred to collectively as a point-of-interface (POI) 507. This is done so that, in the downlink, the desired set of RF carriers output by the base stations 506 can be extracted, combined, and routed to the appropriate master unit 502, and so that, in the uplink, the desired set of carriers output by the master unit 502 can be extracted, combined, and routed to the appropriate interface of each base station 506. In other examples, the POI 507 can be part of the master unit 502.

In the example shown in FIG. 5, in the downlink, the master unit 502 can produce digital IQ samples from an analog signal received at certain radio frequencies. These digital IQ samples can also be filtered, amplified, attenuated, and/or re-sampled or decimated to a lower sample rate. The digital samples can be produced in other ways. Each stream of digital IQ samples represents a portion of the frequency spectrum output by one or more base stations 506.

Likewise, in the uplink, the master unit 502 can produce an uplink analog signal from one or more streams of digital IQ samples received from one or more remote antenna units 504 by digitally combining streams of digital IQ samples that represent the same carriers or frequency bands or sub-bands received from multiple remote antenna units 504 (for example, by digitally summing corresponding digital IQ samples from the various remote antenna units 504), performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined.

In the example shown in FIG. 5, the master unit 502 can be configured to interface with one or more base stations 506 using a digital interface (in addition to, or instead of) interfacing with one or more base stations 506 via an analog RF interface. For example, the master unit 502 can be configured to interact directly with one or more BBUs using the digital IQ interface that is used for communicating between the BBUs and an RRHs (for example, using the CPRI serial digital IQ interface).

In the downlink, the master unit 502 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 504 used in the DAS 500. In the uplink, the master unit 502 receives uplink streams of digital IQ samples from one or more remote antenna units 504, digitally combining streams of digital IQ samples that represent the same carriers or frequency bands or sub-bands received from multiple remote antenna units 504 (for example, by digitally summing corresponding digital IQ samples received from the various remote antenna units 504), and, if necessary, converts (by re-sampling, synchronizing, combining, separating, gain adjusting, etc.) them into uplink streams of digital IQ samples compatible with the one or more BBUs that are coupled to that master unit 502.

In the downlink, each remote antenna unit 504 receives streams of digital IQ samples from the master unit 502, where each stream of digital IQ samples represents a portion of the radio frequency spectrum output by one or more base stations 506. Each remote antenna unit 504 generates, from the downlink digital IQ samples, one or more downlink RF signals for radiation from the one or more antennas coupled to that remote antenna unit 504 for reception by any mobile devices 508 in the associated coverage area. In the uplink, each remote antenna unit 504 receives one or more uplink radio frequency signals transmitted from any mobile devices 508 in the associated coverage area, generates one or more uplink streams of digital IQ samples derived from the received one or more uplink radio frequency signals, and transmits them to the master unit 502.

Each remote antenna unit 504 can be communicatively coupled directly to one or more master units 502 or indirectly via one or more other remote antenna units 504 and/or via one or more intermediate units 516 (also referred to as "expansion units" or "transport expansion nodes"). The latter approach can be done, for example, in order to increase the number of remote antenna units 504 that a single master unit 502 can feed, to increase the master-unit-to-remote-antenna-unit distance, and/or to reduce the amount of cabling needed to couple a master unit 502 to its associated remote antenna units 504. The expansion units are coupled to the master unit 502 via one or more cables 521.

In the example DAS 500 shown in FIG. 5, a remote antenna unit 504 is shown having another co-located remote antenna unit 505 (also referred to herein as an "extension unit") communicatively coupled to it. Subtending a co-located extension remote antenna unit 505 from another remote antenna unit 504 can be done in order to expand the number of frequency bands that are radiated from that same location and/or to support MIMO service (for example, where different co-located remote antenna units radiate and receive different MIMO streams for a single MIMO frequency band). The remote antenna unit 504 is communicatively coupled to the "extension" remote antenna units 505 using a fiber optic cable, a multi-conductor cable, coaxial cable, or the like. In such an implementation, the remote antenna units 505 are coupled to the master unit 502 of the DAS 500 via the remote antenna unit 504.

In some examples, one or more components of the DAS 500 include the wideband modular filter system 100 as described above. For example, the remote antenna units 504, 505 can include the wideband modular filter system 100 in order to provide flexibility in reconfiguring the remote antenna units 504, 505 and reduce the number of remote units that need to be designed for different regions. In some examples, a wideband modular filter system 100 is coupled to the downlink path and/or the uplink path in one or more remote antenna units 504, 505.

Figure 6:
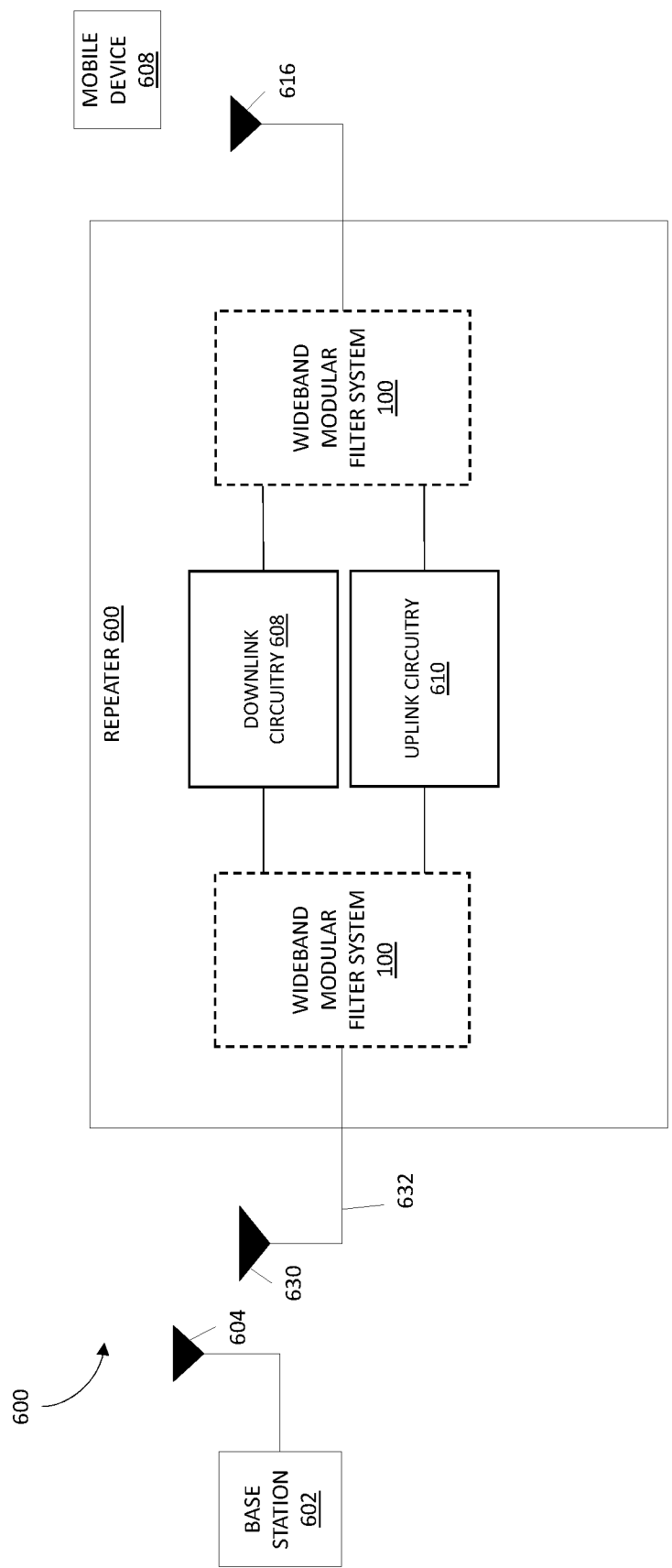
FIG. 6 is a block diagram illustrating an example repeater system utilizing a wideband modular filter system.

Other types of radio frequency distribution systems can also benefit from the wideband modular filter system described above. FIG. 6 illustrates an example of a single-node repeater 600 that includes the wideband modular filter system 100 as discussed above.

In the exemplary embodiment shown in FIG. 6, the single-node repeater 600 is coupled to one or more base stations 602 using a donor antenna 630.

The single-node repeater 600 can include a wideband modular filter system 100 as described above. The single-node repeater 600 can include one or more wideband modular filter systems 100 in order to provide flexibility for reconfiguring the single-node repeater 600 and reduce the number of single-node repeaters that need to be designed for different regions. In some examples, a wideband modular filter system 100 is positioned between the donor antenna 630 and the uplink circuitry 610 and/or a wideband modular filter system 100 is positioned between the downlink circuitry 608 and the coverage antenna 616.

In general, the single-node repeater 600 is configured to receive one or more downlink signals from one or more base stations 602. Each base station downlink signal includes one or more radio frequency channels used for communicating in the downlink direction with user equipment 614 over the relevant one or more wireless air interfaces. The downlink circuitry 608 is configured to amplify the downlink signals received at the repeater 600 and re-radiate the amplified downlink signals via the coverage antenna 616. As a part of doing this, the downlink circuitry 608 can be configured to filter the downlink signals to separate out the individual channels, individually amplify each filtered downlink channel signal, combine the individually amplified downlink channel signals, and re-radiate the resulting combined signal.

Similar processing is performed in the uplink. The single-node repeater 600 is configured to receive one or more uplink signals from mobile device 614. Each mobile device uplink signal includes one or more radio frequency channels used for communicating in the uplink direction with one or more base stations 602 over the relevant one or more wireless air interfaces. The uplink circuitry 610 is configured to amplify the uplink signals received at the repeater 600 and re-radiate the amplified uplink signals via the donor antenna 630. As a part of doing this, the uplink circuitry 610 can be configured to filter the uplink signals to separate out the individual channels, individually amplify each filtered uplink channel signal, combine the individually amplified uplink channel signals, and re-radiate the resulting combined signal.

The single-node repeater 600 can be configured to implement one or more features to provide sufficient isolation between the donor antenna 630 and the coverage antenna 616. These features can include gain control circuitry and adaptive cancellation circuitry. Other features can be implemented. These features can be implemented in one or more of the downlink circuitry 608 and/or the uplink circuitry 610. These features can also be implemented in separate circuitry.

The various circuitry and features of the single-node repeater 600 can be implemented in analog circuitry, digital circuitry, or combinations of analog circuitry and digital circuitry. The downlink circuitry 608 and uplink circuitry 610 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink circuitry 608 and uplink circuitry 610 may share common circuitry and/or components.

Figure 7:
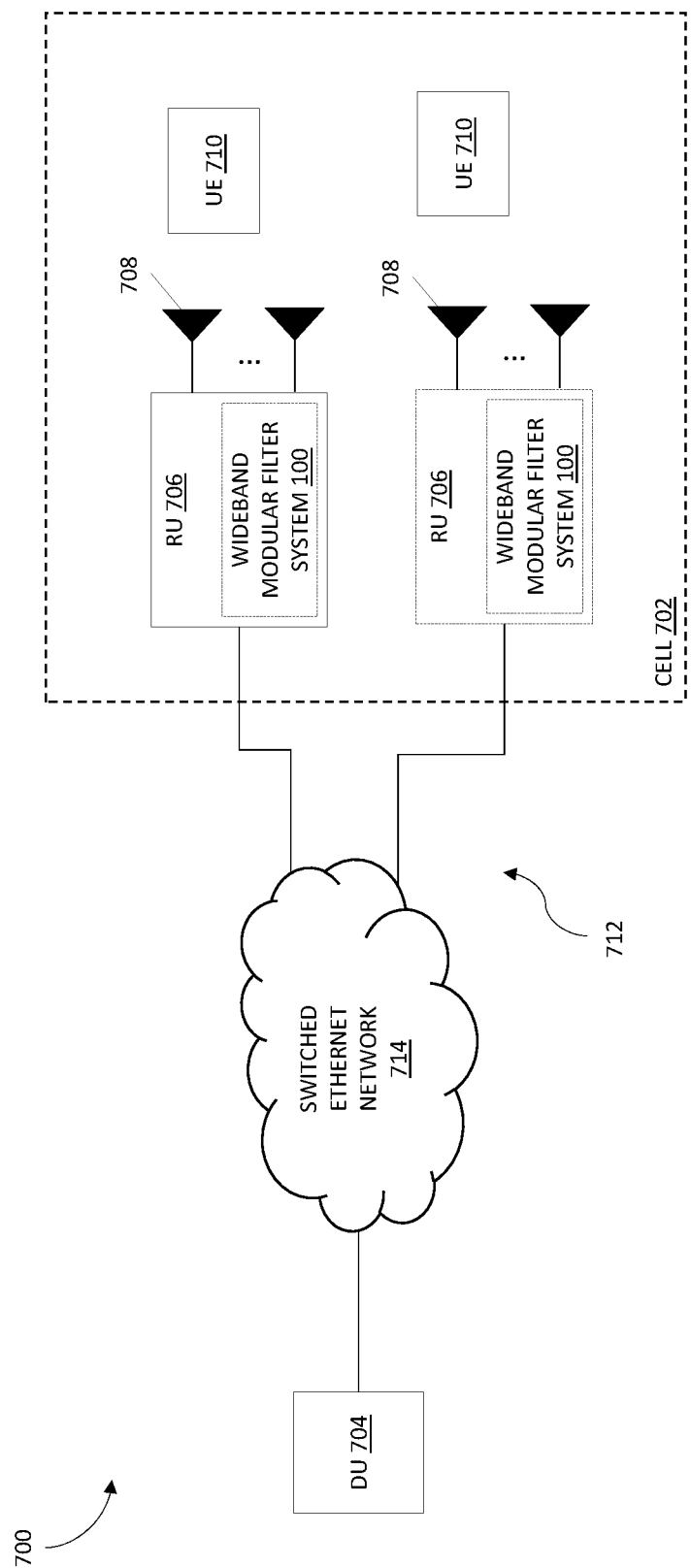
FIG. 7 is a block diagram illustrating an example radio access network utilizing a wideband modular filter system.

Another example of a telecommunication system in which the wideband modular filter system described above can be used is shown in FIG. 7. FIG. 7 is a block diagram illustrating one exemplary embodiment of a radio access network (RAN) system 700 in which the wideband modular filter system 100 described above can be used. The RAN system 700 shown in FIG. 7 implements a base station. The RAN system 700 can also be referred to here as a "base station" or "base station system."

In the example shown in FIG. 7, the system 700 is implemented at least in part using a centralized or cloud RAN (C-RAN) architecture that employs, for each cell (or sector) 702 served by the system 700, at least one distributed unit (DU) 704 and one or more remote units (RUs) 706. The system 700 is also referred to here as a "C-RAN system" 700. The one or more RUs 706 are remotely located from each DU 704 serving it. Also, in some examples, at least one of the RUs 706 is remotely located from at least one other RU 706 serving that cell 702. It should be understood that the C-RAN implementation of the RAN system 700 is only one way of implementing the RAN system 700 and the architecture of the RAN system 700 can be implemented in other ways.

The RAN system 700 can be implemented in accordance with one or more public standards and specifications. For example, the RAN system 700 can be implemented using a RAN architecture and/or RAN fronthaul interfaces defined by the O-RAN Alliance. In such an O-RAN example, the DU 704 and one or more RUs 706 can be implemented as O-RAN distributed units (DUs) and one or more O-RAN remote units (RUs), respectively, in accordance with the O-RAN specifications. More specifically, the DU 704 and the one or more RUs 706 are configured to use the O-RAN fronthaul specification. While multiple RUs 706 are shown in FIG. 7, it should be understood that the RAN system 700 can be implemented with one DU 704 and one RU 706, which is more common for O-RAN implementations.

The one or more RUs 706 include or are coupled to one or more antennas 708 via which downlink RF signals are radiated to various items of user equipment (UE) 710 and via which uplink RF signals transmitted by UEs 710 are received.

In some examples, the system 700 is coupled to a core network of the associated wireless network operator over an appropriate backhaul (such as the Internet). Also, each DU 704 is communicatively coupled to the one or more RUs 706 served by it using a fronthaul 712. Each of the DU 704 and the one or more RUs 706 include one or more network interfaces (not shown) in order to enable the DU 704 and the one or more RUs 706 to communicate over the fronthaul 712.

In one implementation, the fronthaul 712 that communicatively couples the DU 704 to the one or more RUs 706 is implemented using a switched ETHERNET network 714. In such an implementation, each DU 704 and one or more RUs 706 includes one or more ETHERNET interfaces for communicating over the switched ETHERNET network 714 used for the fronthaul 712. However, it is to be understood that the fronthaul between each DU 704 and the one or more RUs 706 served by it can be implemented in other ways.

Generally, for each cell 702 implemented by the RAN system 700, each DU 704 serving the cell 702 performs the LAYER-3 and LAYER-2 functions for the particular wireless interface used for that cell 702. Also, for each cell 702 implemented by the RAN system 700, each corresponding DU 704 serving the cell 702 performs some of the LAYER-1 functions for the particular wireless interface used for that cell 702. Each of the one or more RUs 706 serving that cell 702 perform the LAYER-1 functions not performed by the DU 704 as well as implementing the basic RF and antenna functions.

Each DU 704 and RU 706 (and the functionality described as being included therein), as well as the system 700 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each DU 704, RU 706, and the system 700 more generally, can be implemented in other ways.

In some examples, one or more components of the RAN system 700 include the wideband modular filter system 100 as described above. For example, the one or more RUs 706 can include the wideband modular filter system 100 in order to provide flexibility in reconfiguring the one or more RUs 706 and reduce the number of RUs that need to be designed for different regions. In some examples, a wideband modular filter system 100 is coupled to the downlink path and/or the uplink path in one or more RUs 706.

In various aspects, system elements, method steps, or examples described throughout this disclosure (such as the remote unit, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media, which are provided by communication networks, wired, and/or wireless.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a wideband modular filter system, comprising: a wideband combiner that includes an antenna connector and wideband filter connectors; a first filter module including: a first connector configured to pass a first frequency band; and a first combiner connector configured to pass the first frequency band to a first wideband filter connector of the wideband filter connectors, wherein the first frequency band is coupled to the first combiner connector; a second filter module including: a second connector configured to pass a second frequency band; a third connector configured to pass a third frequency band; a fourth connector configured to pass a fourth frequency band; a fifth connector configured to pass a fifth frequency band; and a second combiner connector configured to pass the second frequency band, the third frequency band, the fourth frequency band, and the fifth frequency band to a second wideband filter connector of the wideband filter connectors, wherein the second frequency band, the third frequency band, the fourth frequency band, and the fifth frequency band are coupled to the second combiner connector.

Example 2 includes the wideband modular filter system of Example 1, wherein the first combiner connector of the first filter module is coupled to the first wideband filter connector of the wideband filter connectors using a first cable, wherein the second combiner connector of the second filter module is coupled to the second wideband filter connector of the wideband filter connectors using a second cable.

Example 3 includes the wideband modular filter system of any of Examples 1-2, wherein the first filter module is configured to pass radio frequency signals less than 1 GHz, wherein the second filter module is configured to pass radio frequency signals higher than 1.4 GHz.

Example 4 includes the wideband modular filter system of any of Examples 1-3, wherein the first filter module and the second filter module are duplexer modules, wherein the first filter module further includes an additional connector configured to pass an additional frequency band; wherein the first frequency band is a first downlink frequency band and the additional frequency band is a first uplink frequency band, wherein the first downlink frequency band and the first uplink frequency band are coupled to the first combiner connector via a resonator and/or one or more first phasing lines internal to the first filter module; and wherein the second frequency band is second downlink frequency band, wherein the third frequency band is a third downlink frequency band, wherein the fourth frequency band is a second uplink frequency band, wherein the fifth frequency band is a third uplink frequency band, wherein the second downlink frequency band, the third downlink frequency band, the second uplink frequency band, and the third uplink frequency band are coupled to the second combiner connector via one or more second common resonators and/or one or more second phasing lines internal to the second filter module.

Example 5 includes the wideband modular filter system of Example 4, further comprising a third filter module that is a duplexer module, wherein the third filter module includes: a sixth connector configured to pass a fourth downlink frequency band; a seventh connector configured to pass a fourth uplink frequency band; and a third combiner connector configured to pass the fourth downlink frequency band and the fourth uplink frequency band to a third wideband filter connector of the wideband filter connectors, wherein the fourth downlink frequency band and the fourth uplink frequency band are coupled to the third combiner connector via a third common resonator and/or one or more third phasing lines internal to the third filter module.

Example 6 includes the wideband modular filter system of Example 4, further comprising a third filter module that is a duplexer module, wherein the third filter module includes: a sixth connector configured to pass a fourth downlink frequency band; a seventh connector configured to pass a fifth downlink frequency band; an eighth connector configured to pass a fourth uplink frequency band; a ninth connector configured to pass a fifth uplink frequency band; and a third combiner connector configured to pass the fourth downlink frequency band, the fifth downlink frequency band, the fourth uplink frequency band, and the fifth uplink frequency band to a third wideband filter connector of the wideband filter connectors, wherein the fourth downlink frequency band, the fifth downlink frequency band, the fourth uplink frequency band, and the fifth uplink frequency band are coupled to the third combiner connector via one or more third common resonators and/or one or more third phasing lines internal to the third filter module.

Example 7 includes the wideband modular filter system of any of Examples 1-3, wherein the first filter module and the second filter module are diplexer modules.

Example 8 includes the wideband modular filter system of any of Examples 1-3, wherein the first filter module and the second filter module are frequency selective splitter modules.

Example 9 includes the wideband modular filter system of any of Examples 1-8, wherein the wideband modular filter system is integrated into a node of a telecommunications system, the node of the telecommunications system comprising: a first power amplifier communicatively coupled to the first filter module; a second power amplifier communicatively coupled to the second filter module; and one or more processors configured to condition signals in at least one of an uplink path or downlink path of the node of the telecommunications system.

Example 10 includes the wideband modular filter system of Example 9, wherein the node of the telecommunications system comprises one of: a remote unit of a distributed antenna system; a radio frequency repeater; a radio point for a small cell; or an access point.

Example 11 includes a node of a telecommunications system, comprising: a wideband combiner that includes an antenna connector and wideband filter connectors; a first single duplexer module including: a first connector configured to pass a first downlink frequency band; a second connector configured to pass a first uplink frequency band; and a first combiner connector configured to duplex the first downlink frequency band and the first uplink frequency band, wherein the first downlink frequency band and the first uplink frequency band are coupled to the first combiner connector via a first common resonator and/or one or more first phasing lines internal to the first single duplexer module; and a first double duplexer module including: a third connector configured to pass a second downlink frequency band; a fourth connector configured to pass a third downlink frequency band; a fifth connector configured to pass a second uplink frequency band; a sixth connector configured to pass a third uplink frequency band; and a second combiner connector configured to duplex the second downlink frequency band, the third downlink frequency band, the second uplink frequency band, and the third uplink frequency band, wherein the second downlink frequency band, the third downlink frequency band, the second uplink frequency band, and the third uplink frequency band are coupled to the second combiner connector via one or more second common resonators and/or one or more second phasing lines internal to the first double duplexer module.

Example 12 includes the node of Example 11, wherein the first combiner connector of the first single duplexer module is coupled to a first wideband filter connector of the wideband filter connectors using a first cable, wherein the second combiner connector of the first double duplexer module is coupled to a second wideband filter connector of the wideband filter connectors using a second cable.

Example 13 includes the node of any of Examples 11-12, wherein the first single duplexer module is configured to pass radio frequency signals less than 1 GHz, wherein the first double duplexer module is configured to pass radio frequency signals higher than 1.4 GHz.

Example 14 includes the node of any of Examples 11-13, further comprising a second single duplexer module that includes: a seventh connector configured to pass a fourth downlink frequency band; an eighth connector configured to pass a fourth uplink frequency band; and a third combiner connector configured to duplex the fourth downlink frequency band and the fourth uplink frequency band, wherein the fourth downlink frequency band and the fourth uplink frequency band are coupled to the third combiner connector via a third common resonator and/or one or more third phasing lines internal to the second single duplexer module.

Example 15 includes the node of any of Examples 11-13, further comprising a second double duplexer module that includes: a seventh connector configured to pass a fourth downlink frequency band; an eighth connector configured to pass a fifth downlink frequency band; a ninth connector configured to pass a fourth uplink frequency band; a tenth connector configured to pass a fifth uplink frequency band; and a third combiner connector configured to duplex the second downlink frequency band, the third downlink frequency band, the second uplink frequency band, and the third uplink frequency band, wherein the fourth downlink frequency band, the fifth downlink frequency band, the fourth uplink frequency band, and the fifth uplink frequency band are coupled to the third combiner connector via one or more third phasing lines internal to the second double duplexer module.

Example 16 includes the node of any of Examples 11-15, further comprising: a first power amplifier communicatively coupled to the first connector of the first single duplexer module; a second power amplifier commutatively coupled to the third connector of the first double duplexer module; a third power amplifier communicatively coupled to the fourth connector of the first double duplexer module; and one or more processors configured to condition signals in at least one of an uplink path or downlink path of the node.

Example 17 includes the node of any of Examples 11-16, wherein the node is one of: a remote unit of a distributed antenna system; a radio frequency repeater; a radio point for a small cell; or an access point.

Example 18 includes a double duplexer module, comprising: a first connector configured to pass a first downlink frequency band; a second connector configured to pass a second downlink frequency band; a third connector configured to pass a first uplink frequency band; a fourth connector configured to pass a second uplink frequency band; and a combiner connector configured to duplex the first downlink frequency band, the second downlink frequency band, the first uplink frequency band, and the second uplink frequency band, wherein the first downlink frequency band, the second downlink frequency band, the first uplink frequency band, and the second uplink frequency band are coupled to the combiner connector via one or more common resonators and/or one or more phasing lines internal to the double duplexer module.

Example 19 includes the double duplexer module of Example 18, wherein the combiner connector of the double duplexer module is configured to be coupled to a first wideband filter connector of a wideband combiner using a cable.

Example 20 includes the double duplexer module of any of Examples 18-19, wherein the one or more phasing lines include only a single phasing line.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:
1. A wideband modular filter system, comprising:
a wideband combiner that includes an antenna connector and wideband filter connectors;
a first filter module including:
 a first connector configured to pass a first frequency band; and
 a first combiner connector configured to pass the first frequency band to a first wideband filter connector of the wideband filter connectors, wherein the first frequency band is coupled to the first combiner connector;
a second filter module including:
 a second connector configured to pass a second frequency band;
 a third connector configured to pass a third frequency band;

a fourth connector configured to pass a fourth frequency band;
a fifth connector configured to pass a fifth frequency band; and
a second combiner connector configured to pass the second frequency band, the third frequency band, the fourth frequency band, and the fifth frequency band to a second wideband filter connector of the wideband filter connectors, wherein the second frequency band, the third frequency band, the fourth frequency band, and the fifth frequency band are coupled to the second combiner connector.

2. The wideband modular filter system of claim 1, wherein the first combiner connector of the first filter module is coupled to the first wideband filter connector of the wideband filter connectors using a first cable, wherein the second combiner connector of the second filter module is coupled to the second wideband filter connector of the wideband filter connectors using a second cable.

3. The wideband modular filter system of claim 1, wherein the first filter module is configured to pass radio frequency signals less than 1 GHz, wherein the second filter module is configured to pass radio frequency signals higher than 1.4 GHz.

4. The wideband modular filter system of claim 1, wherein the first filter module and the second filter module are duplexer modules, wherein the first filter module further includes an additional connector configured to pass an additional frequency band;
wherein the first frequency band is a first downlink frequency band and the additional frequency band is a first uplink frequency band, wherein the first downlink frequency band and the first uplink frequency band are coupled to the first combiner connector via a resonator and/or one or more first phasing lines internal to the first filter module; and
wherein the second frequency band is second downlink frequency band, wherein the third frequency band is a third downlink frequency band, wherein the fourth frequency band is a second uplink frequency band, wherein the fifth frequency band is a third uplink frequency band, wherein the second downlink frequency band, the third downlink frequency band, the second uplink frequency band, and the third uplink frequency band are coupled to the second combiner connector via one or more second common resonators and/or one or more second phasing lines internal to the second filter module.

5. The wideband modular filter system of claim 4, further comprising a third filter module that is a duplexer module, wherein the third filter module includes:
a sixth connector configured to pass a fourth downlink frequency band;
a seventh connector configured to pass a fourth uplink frequency band; and
a third combiner connector configured to pass the fourth downlink frequency band and the fourth uplink frequency band to a third wideband filter connector of the wideband filter connectors, wherein the fourth downlink frequency band and the fourth uplink frequency band are coupled to the third combiner connector via a third common resonator and/or one or more third phasing lines internal to the third filter module.

6. The wideband modular filter system of claim 4, further comprising a third filter module that is a duplexer module, wherein the third filter module includes:

a sixth connector configured to pass a fourth downlink frequency band;
a seventh connector configured to pass a fifth downlink frequency band;
an eighth connector configured to pass a fourth uplink frequency band;
a ninth connector configured to pass a fifth uplink frequency band; and
a third combiner connector configured to pass the fourth downlink frequency band, the fifth downlink frequency band, the fourth uplink frequency band, and the fifth uplink frequency band to a third wideband filter connector of the wideband filter connectors, wherein the fourth downlink frequency band, the fifth downlink frequency band, the fourth uplink frequency band, and the fifth uplink frequency band are coupled to the third combiner connector via one or more third common resonators and/or one or more third phasing lines internal to the third filter module.

7. The wideband modular filter system of claim 1, wherein the first filter module and the second filter module are diplexer modules.

8. The wideband modular filter system of claim 1, wherein the first filter module and the second filter module are frequency selective splitter modules.

9. The wideband modular filter system of claim 1, wherein the wideband modular filter system is integrated into a node of a telecommunications system, the node of the telecommunications system comprising:
a first power amplifier communicatively coupled to the first filter module;
a second power amplifier communicatively coupled to the second filter module; and
one or more processors configured to condition signals in at least one of an uplink path or downlink path of the node of the telecommunications system.

10. The wideband modular filter system of claim 9, wherein the node of the telecommunications system comprises one of:
a remote unit of a distributed antenna system;
a radio frequency repeater;
a radio point for a small cell; or
an access point.

11. A node of a telecommunications system, comprising:
a wideband combiner that includes an antenna connector and wideband filter connectors;
a first single duplexer module including:
a first connector configured to pass a first downlink frequency band;
a second connector configured to pass a first uplink frequency band; and
a first combiner connector configured to duplex the first downlink frequency band and the first uplink frequency band, wherein the first downlink frequency band and the first uplink frequency band are coupled to the first combiner connector via a first common resonator and/or one or more first phasing lines internal to the first single duplexer module; and
a first double duplexer module including:
a third connector configured to pass a second downlink frequency band;
a fourth connector configured to pass a third downlink frequency band;
a fifth connector configured to pass a second uplink frequency band;
a sixth connector configured to pass a third uplink frequency band; and a second combiner connector configured to duplex the second downlink frequency band, the third downlink frequency band, the second uplink frequency band, and the third uplink frequency band, wherein the second downlink frequency band, the third downlink frequency band, the second uplink frequency band, and the third uplink frequency band are coupled to the second combiner connector via one or more second common resonators and/or one or more second phasing lines internal to the first double duplexer module.

12. The node of claim 11, wherein the first combiner connector of the first single duplexer module is coupled to a first wideband filter connector of the wideband filter connectors using a first cable, wherein the second combiner connector of the first double duplexer module is coupled to a second wideband filter connector of the wideband filter connectors using a second cable.

13. The node of claim 11, wherein the first single duplexer module is configured to pass radio frequency signals less than 1 GHz, wherein the first double duplexer module is configured to pass radio frequency signals higher than 1.4 GHz.

14. The node of claim 11, further comprising a second single duplexer module that includes:
   a seventh connector configured to pass a fourth downlink frequency band;
   an eighth connector configured to pass a fourth uplink frequency band; and
   a third combiner connector configured to duplex the fourth downlink frequency band and the fourth uplink frequency band, wherein the fourth downlink frequency band and the fourth uplink frequency band are coupled to the third combiner connector via a third common resonator and/or one or more third phasing lines internal to the second single duplexer module.

15. The node of claim 11, further comprising a second double duplexer module that includes:
   a seventh connector configured to pass a fourth downlink frequency band;
   an eighth connector configured to pass a fifth downlink frequency band;
   a ninth connector configured to pass a fourth uplink frequency band;
   a tenth connector configured to pass a fifth uplink frequency band; and
   a third combiner connector configured to duplex the second downlink frequency band, the third downlink frequency band, the second uplink frequency band, and the third uplink frequency band, wherein the fourth downlink frequency band, the fifth downlink frequency band, the fourth uplink frequency band, and the fifth uplink frequency band are coupled to the third combiner connector via one or more third phasing lines internal to the second double duplexer module.

16. The node of claim 11, further comprising:
   a first power amplifier communicatively coupled to the first connector of the first single duplexer module;
   a second power amplifier commutatively coupled to the third connector of the first double duplexer module;
   a third power amplifier communicatively coupled to the fourth connector of the first double duplexer module; and
   one or more processors configured to condition signals in at least one of an uplink path or downlink path of the node.

17. The node of claim 11, wherein the node is one of:
   a remote unit of a distributed antenna system;
   a radio frequency repeater;
   a radio point for a small cell; or
   an access point.

18. A double duplexer module, comprising:
   a first connector configured to pass a first downlink frequency band;
   a second connector configured to pass a second downlink frequency band;
   a third connector configured to pass a first uplink frequency band;
   a fourth connector configured to pass a second uplink frequency band; and
   a combiner connector configured to duplex the first downlink frequency band, the second downlink frequency band, the first uplink frequency band, and the second uplink frequency band, wherein the first downlink frequency band, the second downlink frequency band, the first uplink frequency band, and the second uplink frequency band are coupled to the combiner connector via one or more common resonators and/or one or more phasing lines internal to the double duplexer module.

19. The double duplexer module of claim 18, wherein the combiner connector of the double duplexer module is configured to be coupled to a first wideband filter connector of a wideband combiner using a cable.

20. The double duplexer module of claim 18, wherein the one or more phasing lines include only a single phasing line.

* * * * *